(12) United States Patent
Lee et al.

(10) Patent No.: US 8,767,775 B2
(45) Date of Patent: Jul. 1, 2014

(54) EFFICIENT MAC HEADER DESIGN AND COMMUNICATION USING SAME

(75) Inventors: Eun Jong Lee, Anyang-si (KR); Han Gyu Cho, Anyang-si (KR); Jae Hoon Chung, Anyang-si (KR); Kyu Jin Park, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 13/144,490

(22) PCT Filed: Jan. 14, 2010

(86) PCT No.: PCT/KR2010/000228
§ 371 (c)(1),
(2), (4) Date: Aug. 18, 2011

(87) PCT Pub. No.: WO2010/082768
PCT Pub. Date: Jul. 22, 2010

(65) Prior Publication Data
US 2011/0299443 A1   Dec. 8, 2011

Related U.S. Application Data

(60) Provisional application No. 61/144,451, filed on Jan. 14, 2009.

(30) Foreign Application Priority Data

Jan. 14, 2010   (KR) .................. 10-2010-0003365

(51) Int. Cl.
*H04J 3/24* (2006.01)
*H04L 29/06* (2006.01)
*H04J 3/00* (2006.01)

(52) U.S. Cl.
CPC ............ *H04L 29/0653* (2013.01); *H04L 69/22* (2013.01); *H04J 3/00* (2013.01)
USPC ......................................... 370/473; 370/476

(58) Field of Classification Search
None
See application file for complete search history.

(56) References Cited

U.S. PATENT DOCUMENTS 7,295,529 B2   11/2007   Hwang et al.
7,327,726 B2   2/2008   Kye
(Continued)

OTHER PUBLICATIONS

P. Barber, R. Taori and M. Venkatachalam, UMAC RG Harmonized Text on Headers, Submission to IEEE 802.16m Working Group, Doc. No. C80216m-08/1410r1, Oct. 31, 2008, pp. 1-7.*

(Continued)

*Primary Examiner* — John Blanton
*Assistant Examiner* — Christopher Crutchfield
(74) *Attorney, Agent, or Firm* — Lee, Hong, Degerman, Kang & Waimey

(57) ABSTRACT

A signal transmission method is provided, wherein, when a transmitter transmits a signal to a receiver, a transmitter processor multiplexes a plurality of data for a plurality of connections to be transmitted to one specific receiver, and constitutes a multiplexed medium access control (MAC) packet data unit (PDU) containing a MAC header part for receiving the multiplexed data, and a MAC PDU payload containing the multiplexed data, and the transmitter transmits the multiplexed MAC PDU to the specific receiver. The MAC header part includes a first header part containing a generic MAC header, and a second header part containing an extended header indicator serving as a 1-bit indicator for indicating the existence of an extended header (EH) for each flow ID for each of the plurality of connections. The MAC header part further includes a third header part which selectively contains the extended header for each flow ID in accordance with the extended header indicators for each flow ID.

15 Claims, 20 Drawing Sheets

(56) References Cited

U.S. PATENT DOCUMENTS

| | | | |
|---|---|---|---|
| 7,339,921 | B2 | 3/2008 | Kim et al. |
| 7,440,435 | B2 | 10/2008 | Lim et al. |
| 2005/0220145 | A1* | 10/2005 | Nishibayashi et al. ....... 370/474 |
| 2008/0095071 | A1* | 4/2008 | Lu et al. ......................... 370/254 |

OTHER PUBLICATIONS

H. Zheng, S. Maheshwari, A. Boariu, and Y. Saifullah, MAC PDU and GMH design, Submission to IEEE 802.16m working group, Doc. No. C802.16m-08/652, Jul. 7, 2007, pp. 1-19.*

* cited by examiner (a)

| Management Message Type | Management Message Payload |
|---|---|

FIG. 19

| Header Type | EH | EC | EKS | Length |
|---|---|---|---|---|
| Length |||||

EFFICIENT MAC HEADER DESIGN AND COMMUNICATION USING SAME

CROSS-REFERENCE TO RELATED APPLICATIONS

This application is the National Stage filing under 35 U.S.C. 371 of International Application No. PCT/KR2010/000228, filed on Jan. 14, 2010, which claims the benefit of earlier filing date and right of priority to Korean Application No. 10-2010-0003365, filed on Jan. 14, 2010, and also claims the benefit of U.S. Provisional Application Ser. No. 61/144,451, filed on Jan. 14, 2009, the contents of which are all incorporated by reference herein in their entirety.

TECHNICAL FIELD

The following description relates to a method for efficiently designing a MAC header when configuring a multiplexed MAC PDU, and a method and apparatus for transmitting and receiving signals using the same.

BACKGROUND ART

An Internet based communication system is generally comprised of a protocol stack of five layers and each protocol layer is configured as illustrated in FIG. 1.

FIG. 1 illustrates an example of an Internet protocol stack, which is generally used.

Referring to FIG. 1, an uppermost layer of the protocol stack is an application layer and serves to support network application such as FTP/HTTP/SMTP/RTP. The protocol stack further includes a transport layer which serves to transmit data between hosts using TCP/UDP protocol, and a network layer which performs setup of a data transmission path from a source to a destination through IP protocol. Furthermore, the protocol stack includes a link layer which serves to perform data transmission and Media Access Control (MAC) between peripheral network entities through PPP/Ethernet protocol, and a lowermost physical layer which transmits data in units of bits using wire or wireless media.

FIG. 2 illustrates an operation of each layer for data transmission, which is generally used.

Referring to FIG. 2, a transport layer of a transmitting side generates a new data unit by adding header information to a message payload received from an uppermost layer, i.e., an application layer. The transport layer transmits the data unit to a lower layer, i.e., a network layer. The network layer generates a new data unit by adding header information used for the network layer to the data received from the transport layer, and transmits the data unit to a lower layer, i.e., a link layer. The link layer generates a new data unit by adding header information used for the link layer to the data received from the upper layer, and transmits the generated data unit to a lower layer, i.e., a physical layer. The physical layer transmits the data unit, which has been received from the link layer, to a receiving side.

A physical layer of the receiving side receives the data unit from the transmitting side and transmits the data unit to an upper layer thereof, i.e., a link layer. The receiving side processes a header added to each layer and transmits a message payload, from which a header has been removed, to an upper layer. Data transmission and reception between the transmitting side and the receiving side are performed through the above procedure.

As illustrated in FIG. 2, for data transmission and reception between the transmitting side and the receiving side, each layer performs control functions such as data addressing, routing, forwarding, and data retransmission by adding a protocol header.

FIG. 3 illustrates a protocol layer model defined in a wireless mobile communication system based on an IEEE 802.16 system, which is generally used.

Referring to FIG. 3, a MAC layer belonging to a link layer may include three sublayers. A service-specific Convergence Sublayer (CS) may convert or map external network data, which is received through a CS Service Access Point (SAP), into MAC Service Data Units (SDUs) which are received by a MAC Common Part Sublayer (CPS). In this layer, SDUs of an external network are classified and a function that associates them to a corresponding MAC Service Flow IDentifier (SFID) and Connection IDentifier (CID) may be included.

The MAC CPS provides a core MAC function such as system access, bandwidth allocation, connection setup, and connection maintenance and receives data which is classified by a specific MAC connection from various CSs through the MAC SAP. In this case, Quality of Service (QoS) may be applied to data transmission through a physical layer and scheduling.

A security sublayer may provide an authentication function, a secure key exchange function, and an encryption function.

The MAC layer provides a connection-oriented service and is implemented by the concept of a transport connection. When a mobile station (MS) is registered in a system, a service flow may be provisioned by negotiation between the MS and the system. If service requirements change, a new connection may be established. The transport connection defines mapping between peer convergence processes that utilize MAC and a service flow. The service flow defines QoS parameters of a MAC PDU that are exchanged in a corresponding connection.

A service flow for a transport connection performs a core role in operating MAC protocol and provides a mechanism for uplink and downlink QoS management. In particular, the service flow may be integrated with a bandwidth allocation process.

In a general IEEE 802.16 system, an MS may have a 48-bit universal MAC address per radio interface. This address uniquely defines the radio interface of the MS and may be used during an initial ranging process to establish a connection with the MS. Since a Base Station (BS) verifies MSs by different IDs of the MSs, the universal MAC address may be used during part of an authentication process.

Connections may be identified by a 16-bit CID. During initialization of an MS, two pairs of management connections (uplink and downlink) are established between the MS and the BS and three pairs including the management connections may be optionally used.

The above-described IEEE 802.16-series standard is completing specification of IEEE 802.16e and is underway under the name IEEE 802.16m. Hereinafter, IEEE 802.16e will be briefly referred to as 16e and IEEE 802.16m will be briefly referred to as 16m, unless confusion would arise.

FIG. 4 is a diagram explaining the structure of a MAC Protocol Data Unit (PDU) specified by the 16e standard, and FIG. 5 is a diagram explaining in detail the structure of a generic MAC header in the MAC PDU shown in FIG. 4.

Generally, a link layer (or MAC layer) and a physical layer, which are located at a second layer or below, differently define protocol according to each system such as LAN, Wireless LAN, 3GPP/3GPP2 or Wireless MAN and a header format of a MAC PDU according to the protocol. A MAC header may include a MAC address of a node or a link address for data transmission between nodes in the link layer and may include header error check and link layer control information.

Referring to FIG. 4, each MAC PDU starts with a MAC header of a certain length. The header is located in front of a payload of the PDU. The payload of the MAC PDU includes a subheader, a MAC SDU, and a fragment. The length of payload information may vary to contain a variable number of bytes. Therefore, a MAC sublayer can transmit various traffic types of an upper layer even without recognizing the format or bit pattern of a message. All reserved fields are set to '0' during transmission and are disregarded during reception.

The MAC PDU may include Cyclic Redundancy Check for error detection. A CRC function may be implemented in a physical layer of an OFDMA system. All reserved fields in the MAC PDU are designated as '0' and are disregarded during reception.

Hereinbelow, one scale of a block indicating a header structure including the structure of FIG. 5 denotes one bit, a horizontal column denotes one byte, and going downward denotes sequential arrangement from a Most Significant Bit (MSB) to a Least Significant Bit (LSB).

Referring to FIG. 5, six subheaders may be used for a MAC PDU together with a generic MAC header. Subheaders for each MAC PDU are inserted to the rear of the generic MAC header. Each field included in the MAC header will be described below.

A Header Type (HT) field represents a header type, more particularly represents whether a corresponding MAC PDU is a generic MAC header which includes a payload at the rear thereof or a signaling header for control such as a bandwidth request. An Encryption Control (EC) field represents encryption control, more particularly represents whether a payload has been encrypted. A Type field represents the presence/absence of a subheader suffixed to the header and the type of the subheader. An Extended Subheader Field (ESF) field represents the presence/absence of an extended subheader suffixed to the header.

A CRC Indication (CI) field represents whether CRC is suffixed to the rear of payload. An Encryption Key Sequence (EKS) field represents an encryption key sequence number used for encryption if the payload is encrypted. A Length (LEN) field represents the length of the MAC PDU. A CID field represents a connection identifier to which the MAC PDU is transferred. A connection is used as an identifier of a MAC layer for data and message transmission between the BS and the MS. A CID serves to identify a specific MS or a specific service between the BS and the MS. A Header Check Sequence (HCS) is used to detect an error of the header. In FIG. 5, a number in parenthesis next to each field name represents the number of bits occupied by each field.

Meanwhile, the IEEE 802.16Rev2/D4 standard specifies the concept of MAC PDU concatenation to simultaneously transmit a plurality of MAC PDUs in uplink or downlink transmission.

FIG. 6 is a diagram explaining the concept of MAC PDU concatenation.

As illustrated in FIG. 6, when MAC PDU concatenation is used, MAC PDUs are distinguished by CIDs. In addition, a MAC management message, user data, and a Bandwidth Request (BR) MAC PDU may be concatenated for simultaneous transmission. Since the respective MAC PDUs are distinguished by the respective CIDs, a reception MAC entity can provide a MAC SDC by recombining one or multiple MAC PDUs with a corresponding MAC SAP.

Although the MAC PDU concatenation described in conjunction with FIG. 6 has an advantage of transmitting the MAC PDUs transmitted to the same MS by concatenation, MAC PDU headers should be attached to all payloads since data transmitted for each connection is distinguished by the MAC PDU headers. Even if this is efficient for optimization for a MAC message, optimization for the MAC header is not achieved.

DETAILED DESCRIPTION OF THE INVENTION

Technical Problems

In a 16m system, for which standardization is underway, discrimination between data is being discussed using station IDs for distinguishing between respective receiving sides and flow IDs for distinguishing between connections of the same receiving side, instead of using CIDs. Thus, instead of distinguishing between receiving sides and between connections of the receiving side at a time by one CID, if station IDs are used to hierarchically distinguish between receiving sides and if data corresponding to a plurality of flow IDs with respect to the same receiving side is multiplexed for transmission from one MAC PDU, optimization of the MAC PDU header can be achieved.

Accordingly, the following description is given of a method for configuring an optimized MAC header in a multiplexed MAC PDU corresponding to a plurality of flow IDs for the same receiving side.

Technical Solutions

To achieve these objects and other advantages and in accordance with the purpose of the invention, as embodied and broadly described herein, a method for transmitting signals to a receiver at a transmitter includes multiplexing, at a transmitter processor, a plurality of pieces of data for a plurality of connections to be transmitted to one specific receiver, and configuring a multiplexed Medium Access Control (MAC) Packet Data Unit (PDU) which includes a MAC header part for receiving the multiplexed data and includes a MAC PDU payload including the multiplexed data, and transmitting, at the transmitter, the multiplexed MAC PDU to the specific receiver, wherein the MAC header part includes a first header part including a generic MAC header and includes a second header part including an extended header indicator serving as a one-bit indicator representing whether an extended header is present for each flow ID indicating each of the plurality of connections, and wherein the MAC header part selectively further includes a third header part including the extended header for each flow ID according to the extended header indicator for each flow ID.

Data transmitted by the transmitter may be distinguished by a station ID for distinguishing between respective receivers and by the flow ID for distinguishing between respective connections with the specific receiver.

The generic MAC header may include a first field containing the flow ID and include a second field representing the length of the multiplexed MAC PDU. The extended header indicator of the second header may represent, if the number of the plurality of connections is N, whether an extended header for each flow ID is present using one bit for each of N flow IDs. The extended header of the third header may include a type field representing the type of each extended header and include a contents field containing the contents of each extended header. The extended header may further include an END field representing whether an additional header is present after the extended header.

The second header part may be a multiplexing extended header.

In another aspect of the present invention, a transmitter for transmitting signals to a receiver includes a processor for multiplexing a plurality of pieces of data for a plurality of connections to be transmitted to a specific receiver, and configuring a multiplexed Medium Access Control (MAC) Packet Data Unit (PDU) which includes a MAC header part for receiving the multiplexed data and includes a MAC PDU payload including the multiplexed data, and a transmission module for transmitting the multiplexed MAC PDU to the specific receiver, wherein the MAC header part includes a first header part including a generic MAC header and includes a second header part including an extended header indicator serving as a one-bit indicator representing whether an extended header is present for each flow ID indicating each of the plurality of connections, and wherein the MAC header part selectively includes a third header part including the extended header for each flow ID according to the extended header indicator for each flow ID.

Data transmitted by the transmitter may be distinguished by a station ID for distinguishing between respective receivers and by the flow ID for distinguishing between respective connections with the specific receiver.

The generic MAC header may include a first field containing the flow ID and include a second field representing the length of the multiplexed MAC PDU. The extended header indicator of the second header may represent, if the number of the plurality of connections is N, whether an extended header for each flow ID is present using one bit for each of N flow IDs. The extended header of the third header may include a type field representing the type of each extended header and include a contents field containing the contents of each extended header.

The second header part may be a multiplexing extended header.

In a further aspect of the present invention, a method for receiving signals from a transmitter at a receiver includes receiving, from the transmitter, a Medium Access Control (MAC) Packet Data Unit (PDU) obtained by multiplexing a plurality of pieces of data for a plurality of connections transmitted to the receiver, and processing, at a receiver processor, a multiplexed MAC PDU which includes a MAC header part of the MAC PDU and includes a MAC PDU payload containing the multiplexed data, wherein the MAC header part includes a first header part including a generic MAC header and includes a second header part including an extended header indicator serving as a one-bit indicator representing whether an extended header is present for each flow ID indicating each of the plurality of connections, and wherein the MAC header part selectively includes a third header part including the extended header for each flow ID according to the extended header indicator for each flow ID.

In still another aspect of the present invention, a receiver for receiving signals from a transmitter includes a reception module for receiving, from the transmitter, a Medium Access Control (MAC) Packet Data Unit (PDU) obtained by multiplexing a plurality of pieces of data for a plurality of connections transmitted to the receiver, and a processor for processing a multiplexed MAC PDU which includes a MAC header part of the MAC PDU and includes a MAC PDU payload containing the multiplexed data, wherein the MAC header part includes a first header part including a generic MAC header and includes a second header part including an extended header indicator serving as a one-bit indicator representing whether an extended header is present for each flow ID indicating each of the plurality of connections, and wherein the MAC header part selectively includes a third header part including the extended header for each flow ID according to the extended header indicator for each flow ID.

Advantages Effects

According to the various aspects of the present invention as described above, overhead can be efficiently reduced in a communication system by using a MAC header optimized to transmit information only once which may be repetitively transmitted in a multiplexed MAC PDU.

BRIEF DESCRIPTION OF THE DRAWINGS

FIG. 18 is a diagram illustrating the structure of a MAC management message according to a fourth embodiment of the present invention;

FIG. 19 is a diagram illustrating the structure of a header according to the fourth embodiment of the present invention;

BEST MODE FOR CARRYING OUT THE INVENTION

Figure 1:
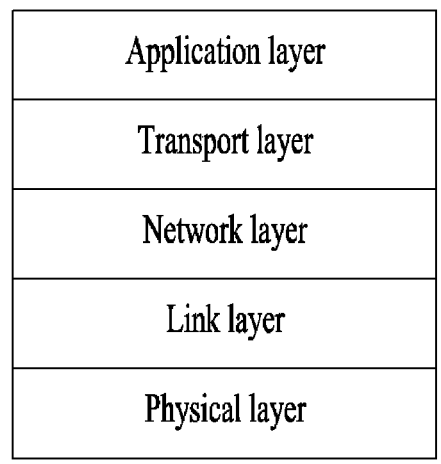
FIG. 1 is a diagram illustrating an example of an Internet protocol stack, which is generally used.
Figure 2:
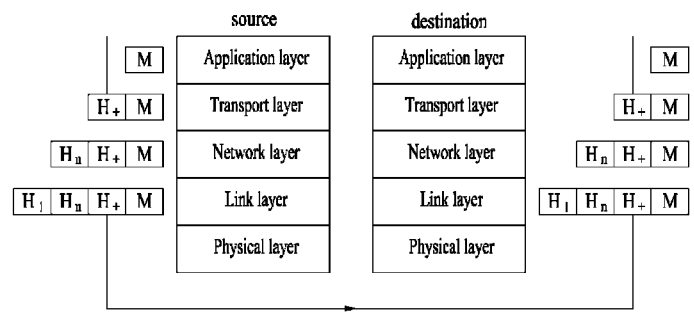
FIG. 2 is a diagram illustrating an operation of each layer for data transmission, which is generally used.
Figure 3:
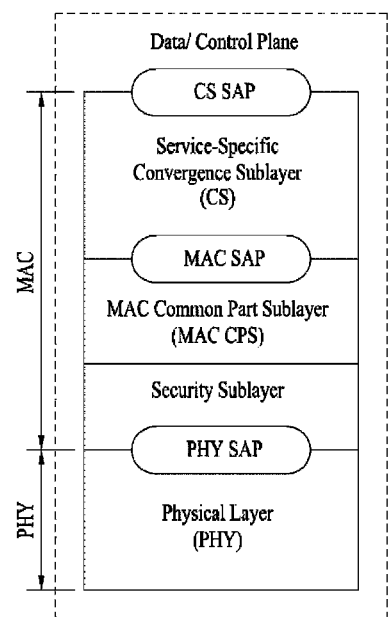
FIG. 3 illustrates a protocol layer model defined in a wireless mobile communication system based on an IEEE 802.16 system, which is generally used.
Figure 4:
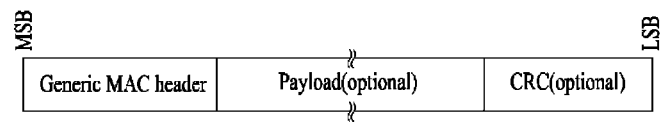
FIG. 4 is a diagram explaining the structure of a MAC Protocol Data Unit (PDU) specified in the 16e standard.

The following embodiments are achieved by combination of elements and features of the present invention in a predetermined manner. Each of the elements or features may be considered selective unless otherwise specified explicitly. Each of the elements or features may be carried out without being combined with other elements or features. Also, some elements and/or features may be combined with one another to constitute the embodiments of the present invention. The order of operations described in the embodiments of the present invention may be changed. Some constructions of any one embodiment may be included in another embodiment or may be replaced with corresponding constructions of another embodiment.

In the description of drawings, procedures or steps that may obscure the subject matter of the present invention will not be disclosed. Also, procedures or steps that may be understood by a person with ordinary skill in the art will not be disclosed.

The embodiments of the present invention are described based on data transmission and reception between a base station and a mobile station. In this case, the base station means a terminal node of a network, which performs direct communication with the mobile station. A specific operation described as being performed by the base station may be performed by an upper node of the base station.

In other words, it will be apparent that various operations performed for communication with the mobile station in the network comprised of a plurality of network nodes including the base station may be performed by the base station or network nodes other than the base station. The Base Station (BS) may be replaced with terms such as fixed station, Node B, eNode B (eNB), and access point. Also, the Mobile Station (MS) may be replaced with terms such as User Equipment (UE), Subscriber Station (SS), Mobile Subscriber Station (MSS), mobile terminal, and terminal.

Furthermore, a transmitting side refers to a fixed and/or mobile node that provides data services or voice services while a receiving side refers to a fixed and/or mobile node that receives data services or voice services. Accordingly, in uplink, the mobile station may be a transmitting side while the base station may be a receiving side. Likewise, in downlink, the mobile station may be a receiving side while the base station may be a transmitting side.

Meanwhile, in the present invention, examples of the mobile station include a Personal Digital Assistant (PDA), a cellular phone, a Personal Communication Service (PCS) phone, a Global System for Mobile (GSM) phone, a Wideband CDMA (WCDMA) phone, and a Mobile Broadband System (MBS) phone. Also, examples of the mobile station further include a hand-held PC, a notebook PC, a smart phone, and a Multi Mode-Multi Band (MM-MB) terminal.

In this case, the smart phone is a terminal combining advantages of a mobile communication terminal and a PDA. Namely, the smart phone may mean a terminal in which a schedule management function of a PDA and data communication functions of facsimile transmission/reception, Internet access, etc. are integrated with functions of a mobile communication terminal. Also, the MM-MB terminal refers to a terminal having a built-in multi-MODEM chip to be operable in a portable Internet system and other mobile communication systems (e.g., Code Division Multiple Access (CDMA) 2000 system, Wideband CDMA (WCDMA) system, etc.).

The embodiments according to the present invention can be implemented by various means, for example, hardware, firmware, software, or combinations thereof.

If the embodiment according to the present invention is implemented by hardware, the embodiment of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well known means.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terminology disclosed herein can be described by the above standard documents. Particularly, the embodiments of the present invention can be supported by one or more of standard documents of IEEE 802.16 system, i.e., P802.16-2004, P802.16e-2005, and P802.16Rev2.

Hereinafter, the exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out.

Specific terminology hereinafter used in the embodiments of the present invention are provided to assist in understanding of the present invention, and various modifications can be made to the specific terminology within the range that they do not depart from the technical spirit of the present invention.

As described above, the following description discloses a method for configuring an optimized MAC header in a multiplexed MAC PDU corresponding to a plurality of flow IDs for the same receiving side. In this case, it is assumed that the multiplexed MAC PDU has a form in which data corresponding to various flow IDs transmitted to one receiving side is multiplexed. A flow ID may represent whether a connection with a receiving side is for transport/management/signaling.

Figure 7:
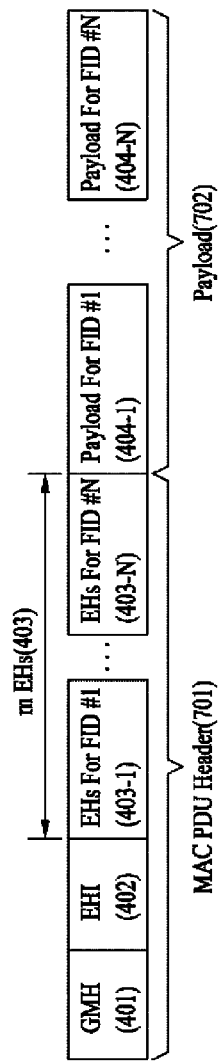
FIG. 7 is a diagram illustrating the structure of a MAC PDU according to an embodiment of the present invention.

FIG. 7 is a diagram illustrating the structure of a MAC PDU according to an embodiment of the present invention.

Figure 5:
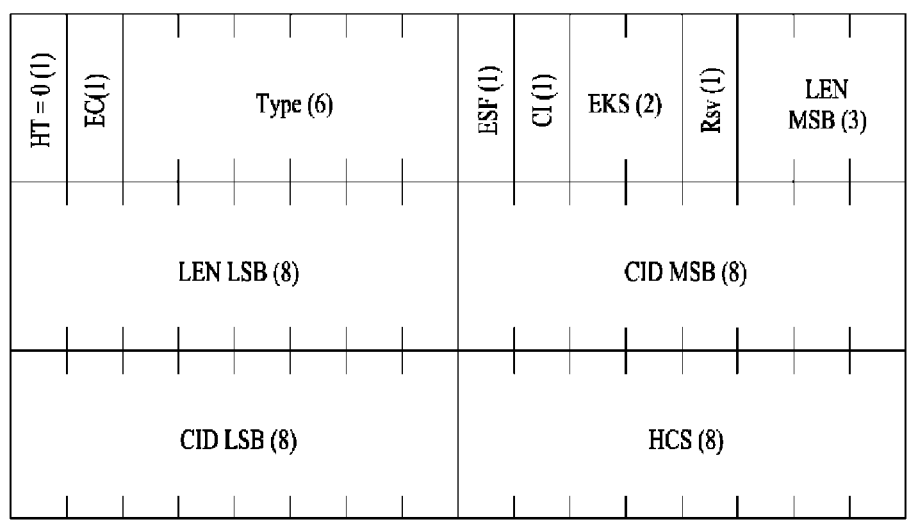
FIG. 5 is a diagram explaining in detail the structure of a generic MAC header in the MAC PDU shown in FIG. 4.
Figure 6:
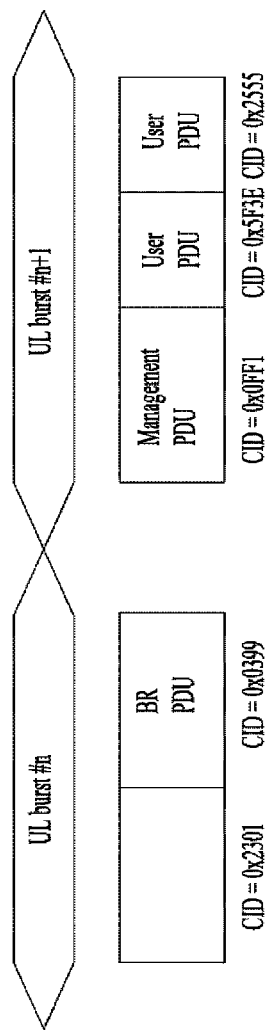
FIG. 6 is a diagram explaining the concept of MAC PDU concatenation.

The MAC PDU according to an embodiment of the present invention as shown in FIG. 7 may also include a MAC PDU header 701 and a payload 702. However, it is assumed that the MAC PDU header 701 according to the embodiment of the present invention includes a generic MAC header 401 of a compact type compared with the structure of FIG. 5. In other words, the generic MAC header 401 is assumed as a type including minimum information, such as a field including flow ID information and a field representing the length of a multiplexed MAC PDU. Additional header information with respect to each flow ID may be transmitted through an Extended Header (hereinafter, "EH") if necessary. For example, if a specific connection is for data transport, data therefor may be processed by fragmentation or packing for transmission. In this embodiment, information about such fragmentation/packing may be transmitted through a Fragmentation and Packing Extended Header (FPEH). As another example, a specific flow ID may be for management and, at this time, information about a management connection may be transmitted through a MAC Control Extended Header (MCEH). Each EH may include a type field representing the type of an EH and a field including the contents of each EH and, if necessary, it may include an END field representing whether a subsequent EH is present. For instance, if an END field of a corresponding EH represents that an additional EH is present, the subsequent EH is read and this may continue until an END field of a corresponding EH represents that there are no additional EHs.

As mentioned above, the type and/or necessity of an EH may differ according to each flow ID. Therefore, a MAC header proposed according to an embodiment of the present invention includes a field 402 which represents whether an EH for each flow ID is present using a 1-bit indicator. In FIG. 7, the above field 402 is illustrated as an Extended Header Indicator (EHI) and may be specified as a type which is included in a multiplexing extended header in that it is an EH necessary especially for a multiplexing MAC PDU. If the number of multiple flow IDs related to the MAC PDU is N, the field 402 including the EHI may represent whether an EH for each of the flow IDs is present using one-bit information for each of N flow IDs. That is, if the EHI for a corresponding flow ID is set to 1, this may indicate that an EH is present in the corresponding flow ID. On the contrary, if the EHI is set to 0, this may indicate that an EH is absent in the corresponding flow ID.

At this point, a connection type for each flow ID is specified and the type of a subsequent EH may be specified. For example, if a corresponding flow ID is for a transport connection and an EHI for this flow ID is set to 1, this may represent that the above-described FPEH is present in the corresponding flow ID. As another example, if a corresponding flow ID is for a management connection and an EHI for this flow ID is set to 1, this may represent that the above-described MCEH is present in the corresponding ID.

As illustrated in FIG. 7, the payload 702 of the MAC PDU may be transmitted after the MAC PDU header 701. The payload 702 may include data/information for each flow ID and information thereon may be transmitted/acquired through the MAC PDU header 701.

Hereinafter, detailed embodiments according to the above description will be described with reference to the accompanying drawings.

First Embodiment

Figure 8:
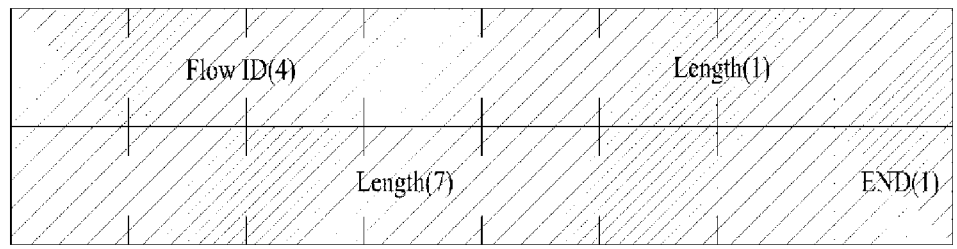
FIG. 8 is a diagram illustrating the structure of a generic MAC header according to a first embodiment of the present invention.

FIG. 8 is a diagram illustrating the structure of a generic MAC header according to a first embodiment of the present invention.

A generic MAC header proposed according to the present embodiment has a compact type for minimum overhead compared with a generic MAC header in an existing 16e system. The generic MAC header illustrated in FIG. 8 includes a FLOW ID field representing a flow ID, a Length field representing length, and an END field representing whether an additional header is present after the Length field. More specifically, the FLOW ID field indicates whether a corresponding connection is for transport/management/signaling through an assigned flow ID. The Length field may indicate the whole length of a Service Data Unit (SDU) or payload corresponding to each flow ID. A receiving side may determine whether there is a subsequent header using the END field. Although FIG. 8 illustrates the FLOW ID field of 4 bits, the Length field of 11 bits, and the END field of 1 bit, the numbers of assigned bits are not limited thereto.

Figure 9:
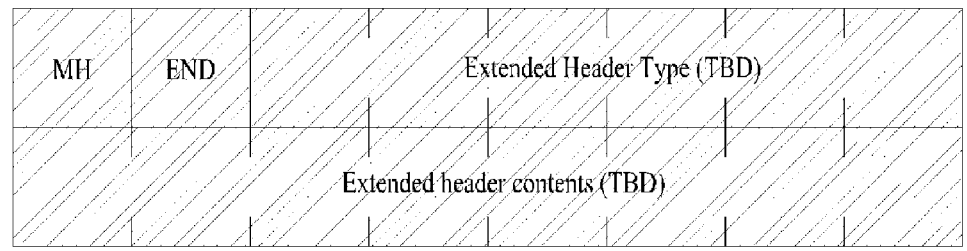
FIG. 9 is a diagram illustrating the structure of an extended header according to the first embodiment of the present invention.

FIG. 9 is a diagram illustrating the structure of an EH according to the first embodiment of the present invention.

The EH according to this embodiment is assumed to include a Multiplexing Header Indicator field (hereinafter, "MH field") representing whether the EH is a multiplexing header or another EH, an END header representing whether an additional header is present after the EH, an EH type field representing the type of the EH, and an EH contents field representing the contents of the EH. The EH type field may indicate whether the EH is an FPEH, GMSH, ARQ feedback, Mesh EH, or FFSH. In FIG. 9, the number of bits of the EH type field and the number of bits of the EH contents field are not specified.

Figure 10:
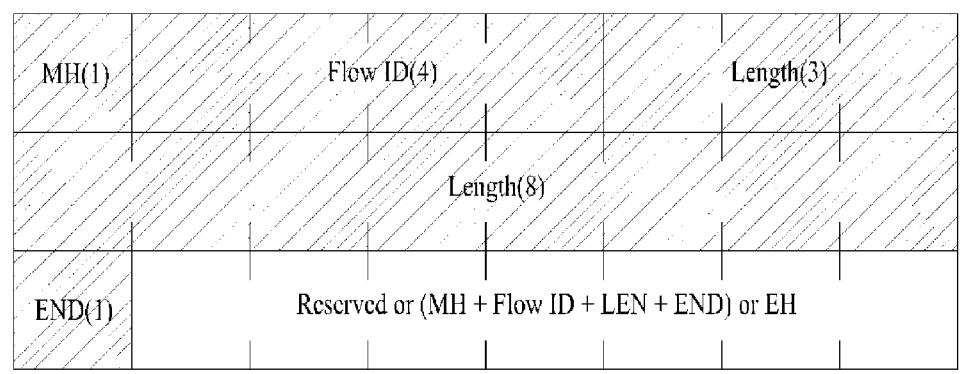
FIG. 10 is a diagram explaining in detail a signal transmission method using the extended header shown in FIG. 9.

FIG. 10 is a diagram explaining in detail a signal transmission method using the structure of the EH shown in FIG. 9.

The embodiment shown in FIG. 10 illustrates the case where SDUs or SDU fragments corresponding to a plurality of flow IDs transmitted to a specific receiving side are multiplexed and transmitted and a Multiplexing Extended Header (MEH) is transmitted to represent the multiplexed transmission. An MH field is set to 1 to represent that the corresponding EH is an MEH. A Flow ID field represents that a corresponding flow ID is for a transport/management/signaling connection and, in this embodiment, it is assumed that the corresponding flow ID is for a transport connection. A Length field may indicate a whole length of SDUs (or payload) corresponding to the transport connection. Meanwhile, an END field may indicate whether there is an additional EH for the corresponding flow ID.

Figure 11:
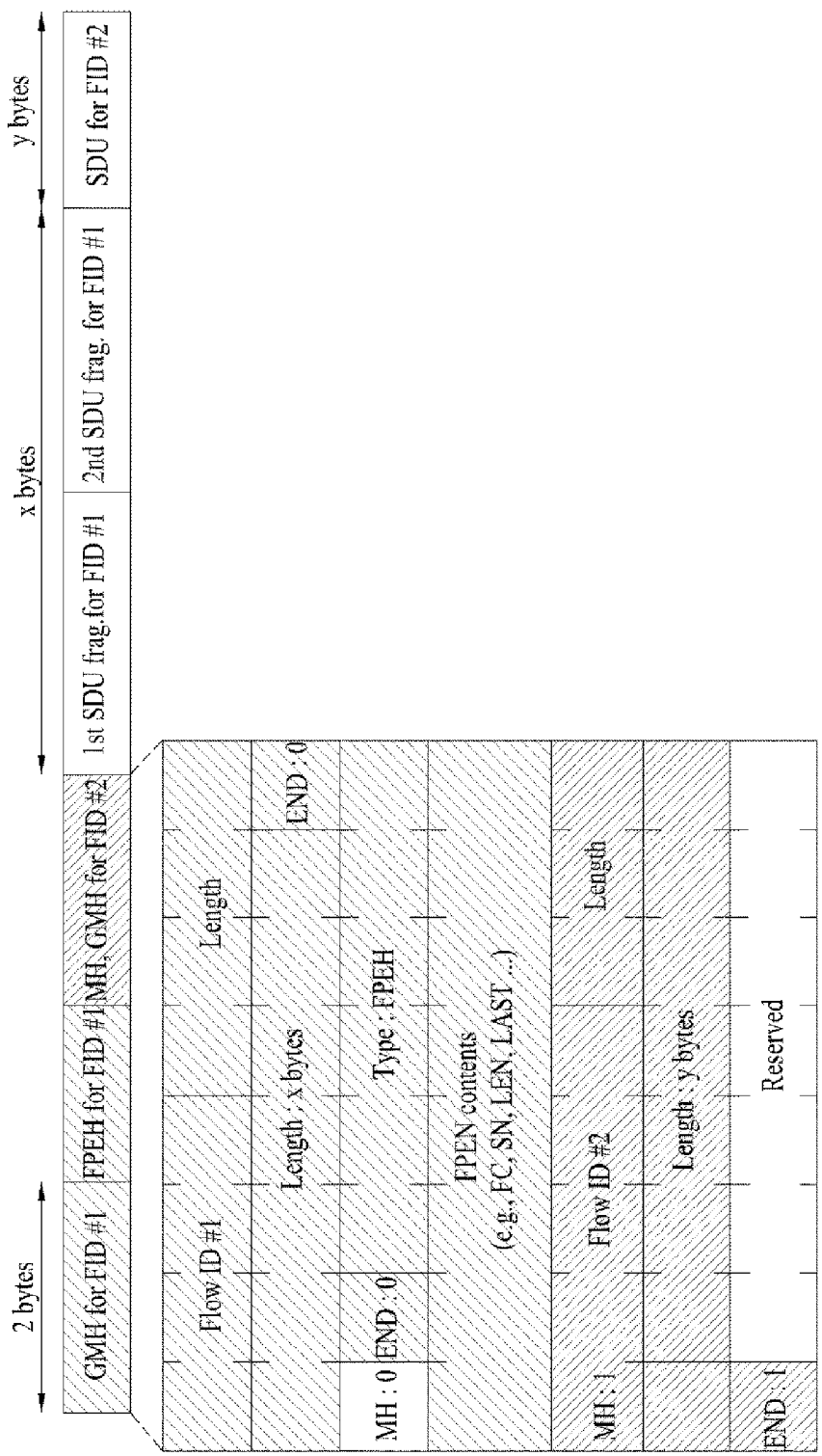
FIG. 11 is a diagram explaining the structure of a MAC PDU according to the first embodiment of the present invention.

FIG. 11 is a diagram explaining the structure of a MAC PDU according to the first embodiment of the present invention.

The MAC PDU according to this embodiment may include a generic MAC header which includes a Flow ID field, a Length field, and an END field. In FIG. 11, it is assumed that the generic MAC header includes the Flow ID field with flow ID #1 and the other flow IDs are indicated by subsequent EHs. In FIG. 11, the Length field of the generic MAC header indicates that SDUs/SDU fragments for flow ID #1 are x bytes. The END field is set to 0 to indicate that a subsequent header is present.

As an EH for flow ID #1, transmission of an FPEH is shown. Since the FPEH is not an MEH, an MH field is set to 0. An EH type field may represent that the corresponding EH is an FPEH. The FPEH may indicate information about fragmentation, packing, etc. through a Fragment Control (FC) field, a Sequence Number (SN) field, a Length field, a LAST field, etc.

In an example of FIG. 11, transmission of an MEH for flow ID #2 is also shown. In an MEH, an MH field is set to 1. A Flow ID field may represent that the MEH is for flow ID #2.

The Length field may represent that the length of an SDU for flow ID #2 is y bytes. An END field may be set to 1 to indicate that there is no header information after the MEH.

Figure 12:
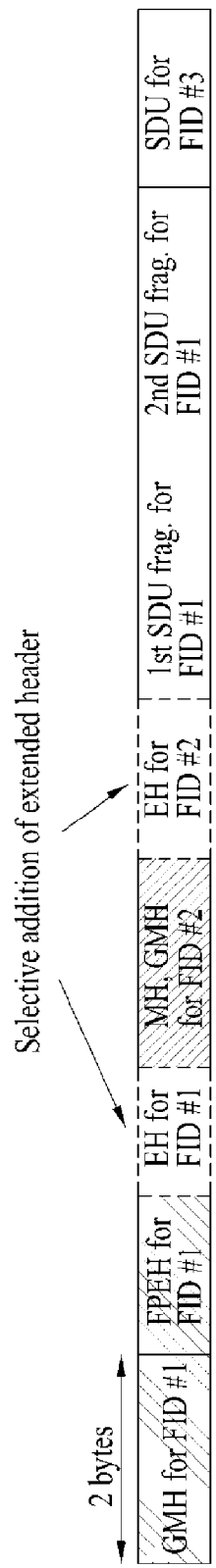
FIG. 12 is a diagram illustrating an example of modification of FIG. 11.

An additional EH for flow ID #1 and/or flow ID #2 may be included. This may be performed by adjusting the MH field and the END field immediately before the MH field according to the type of an added EH and is shown in FIG. 12.

Second Embodiment

Figure 13:
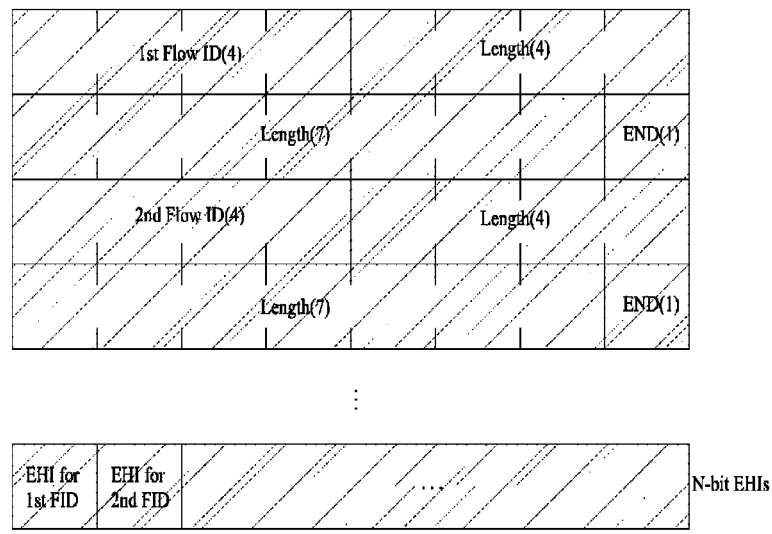
FIG. 13 is a diagram illustrating the structure of a generic MAC header according to a second embodiment of the present invention.

FIG. 13 is a diagram illustrating the structure of a generic MAC header according to a second embodiment of the present invention.

The generic MAC header according to the present embodiment as shown in FIG. 13 may include Flow ID fields representing all flow IDs, Length fields representing the lengths of SDUs/payloads for the respective flow IDs, and END fields representing whether an additional generic MAC header is present after the corresponding generic MAC header.

Meanwhile, in the present embodiment, the END field indicates not whether subsequent header information is present but whether a subsequent generic MAC header is present. That is, it is assumed that the END field performs a function indicating whether additional multiplexing is present. Accordingly, it is assumed that, if there is an additional EH for a specific flow ID, a 1-bit EHI for informing that the EH is present is included for each flow ID.

In FIG. 13, N 1-bit EHIs for N flow IDs are shown after the generic MAC header.

Figure 14:
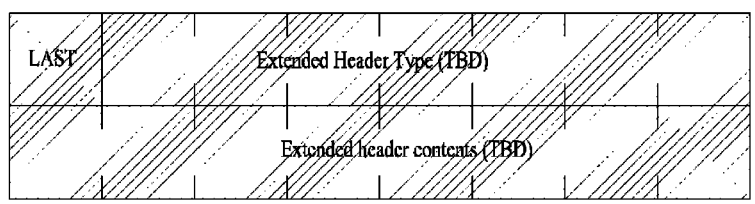
FIG. 14 is a diagram illustrating the structure of an extended header according to the second embodiment of the present invention.

FIG. 14 is a diagram illustrating the structure of an EH according to the second embodiment of the present invention.

The EH according to this embodiment may include a LAST field which represents whether an additional EH for a corresponding flow ID is present after the corresponding EH and an EH contents field which includes EH type information representing what type of EH belongs to the corresponding EH and includes the contents of the EH.

Figure 15:
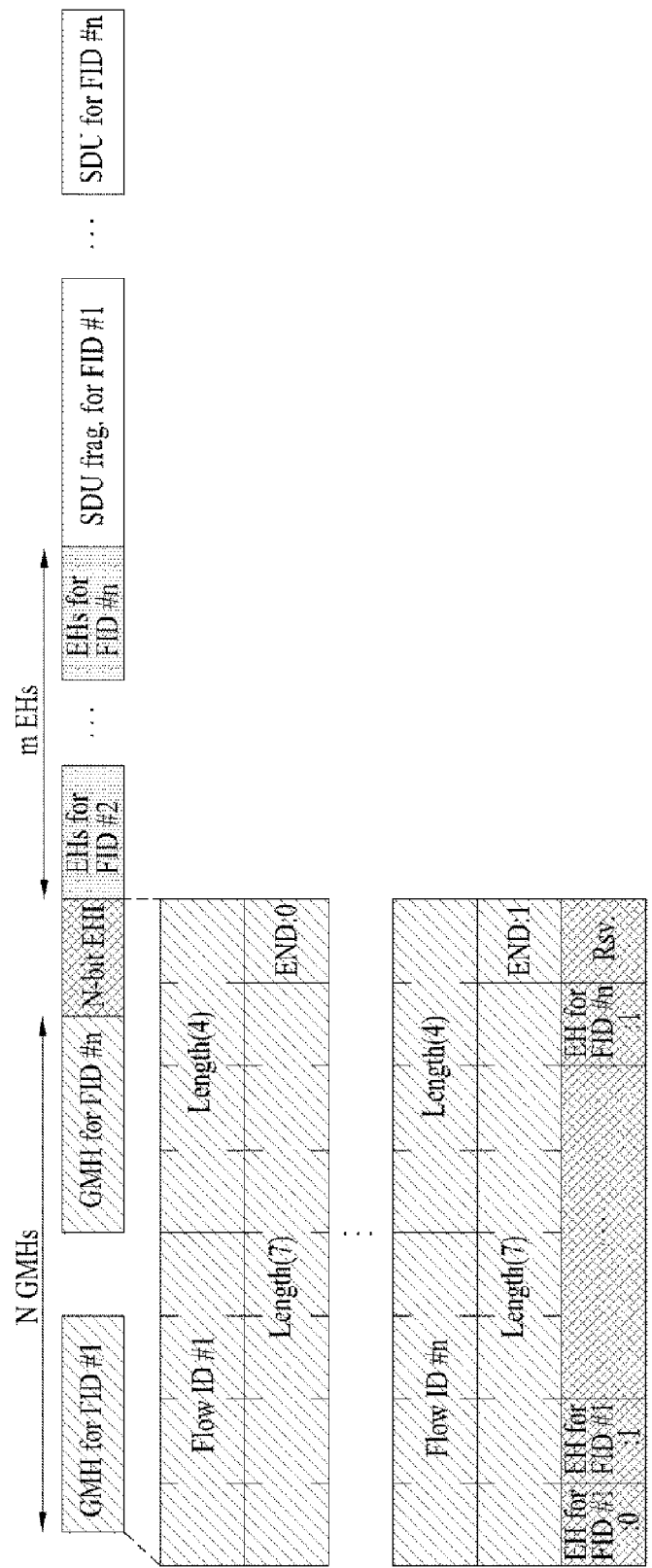
FIG. 15 is a diagram explaining an example of MAC PDU transmission using the configuration of the MAC header according to the second embodiment of the present invention.

FIG. 15 is a diagram explaining an example of MAC PDU transmission using the structure of the MAC header according to the second embodiment of the present invention.

FIG. 15 shows generic MAC header information included for each flow ID. N GMHs shown in FIG. 15 are a first header field of a MAC PDU according to the present embodiment and may be referred to as a generic MAC header field.

Further, an EHI field representing whether an additional EH for each flow ID is present may be included. This EHI information may function as an MEH and may configure a second header field of the MAC PDU according to the present embodiment.

Next, the EHI may be followed by third header fields including EHs for the respective flow IDs. Although m EHs are included in FIG. 15, m may be greater or less than N. Since an EH for each flow ID may be selectively present, the third header fields may be omitted.

The above-described MAC header may be followed by SDUs/payloads for the respective flow IDs.

Third Embodiment

Figure 16:
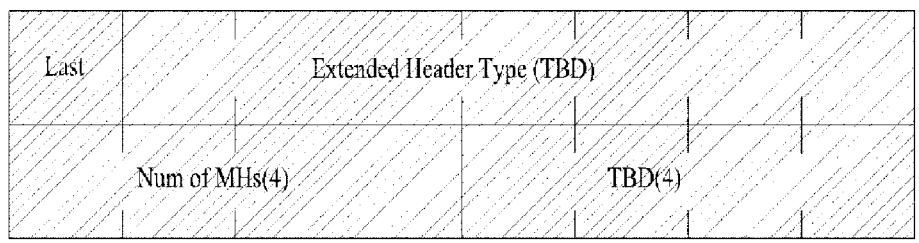
FIG. 16 is a diagram illustrating the structure of an extended header according to a third embodiment of the present invention.
Figure 16:
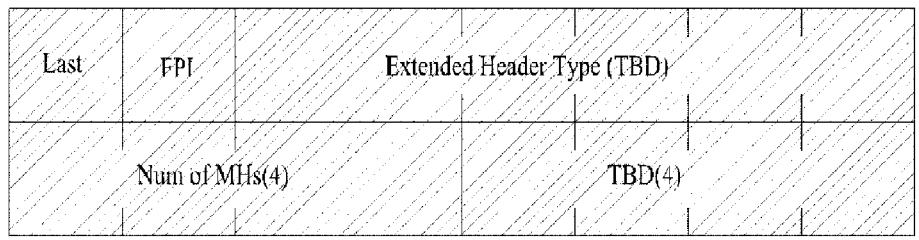

FIG. 16 is a diagram illustrating the structure of an EH according to a third embodiment of the present invention.

Each of the EHs according to the present embodiment as shown in (a) and (b) of FIG. 16 may include a LAST field representing whether an additional EH is present after the header, an EH Type field representing the type of the EH, and a Flow Number field representing the number of multiplexed flows. The EH of (b) of FIG. 16 additionally includes a Fragmentation and Packing Indicator (FPI) field representing whether the EH is an FPEH.

Figure 17:
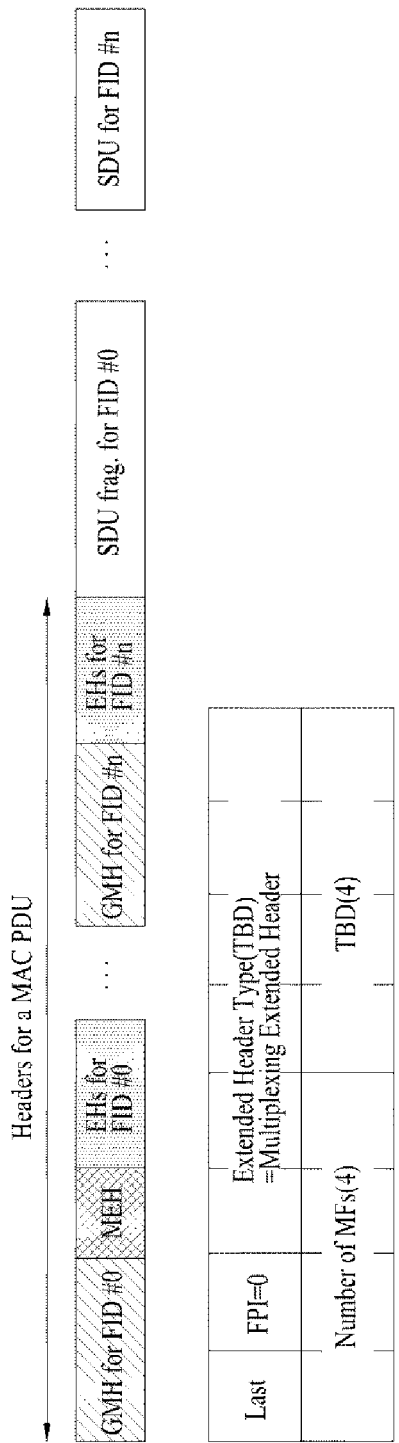
FIG. 17 is a diagram illustrating a MAC PDU transmission method according to the third embodiment of the present invention.

FIG. 17 is a diagram illustrating a MAC PDU transmission method according to the third embodiment of the present invention.

The present embodiment shows an example of transmitting an MEH after a generic MAC header for flow ID #0. Since an additional EH for a flow ID is present after the MEH, a LAST field may indicate that the EH is present. Since the MEH is not an FPEH, an FPI is set to 0. An EH type field may represent that the EH is an MEH and a subsequent multiplexed flow number field may represent the number of multiplexed flow IDs in this MAC PDU.

The MAC PDU shown in FIG. 17 includes a generic MAC header for a subsequent flow ID, and an EH which is optional. SDUs/payloads, which follow MAC header information, may be transmitted as data for respective flow IDs.

Fourth Embodiment

The present embodiment additionally considers a MAC management message for transmitting a MAC PDU payload.

FIG. 18 is a diagram illustrating the configuration of a MAC management message according to a fourth embodiment of the present invention.

The MAC management message according to the present embodiment may include a management message type field and a management message payload field as shown in FIG. 18. It is assumed that a MAC management message for base, broadcast, and initial ranging connections is not fragmented or packed. Meanwhile, a MAC management message for a primary management connection may be fragmented and/or packed. A MAC management message for a broadcast connection which can be fragmented may be fragmented.

It is assumed that the MAC management message as shown in FIG. 18 is not transmitted for a transport connection.

FIG. 19 is a diagram illustrating the structure of a header according to the fourth embodiment of the present invention.

The MAC header shown in FIG. 19 includes an HT field. The present embodiment assumes that a management MAC header and a multiplexing MAC header are defined as one HT. For example, if the HT field is 2 bits, 00 is used for long data transmission with a flow ID and may be regarded as a generic MAC header; 01 is used for short data transmission with a flow ID and may be regarded as a compact MAC header; 10 is used when a payload is not present without any flow ID and may be regarded as a signaling MAC header; and 11 is used when a payload is present without any flow ID and may be regarded as a management/multiplexing MAC header according to the present embodiment.

In this embodiment, the management MAC header and the multiplexing MAC header use the same header format of 2 bytes. The above two messages can be distinguished by presence/absence of an EH (e.g. MEH). The present embodiment assumes that the management MAC header and the multiplexing MAC header can support long data as in general data. To this end, a Length field of this header preferably supports the length (11 bits) or more of a Length field used in a MAC PDU header. However, it is desirable that the number of bits of the Length field in this embodiment be designed to conform to the length of a Length field defined in a generic MAC header. Since the present embodiment assumes that the Length field of the generic MAC header is 11 bits, it is also assumed that the Length field of the header according to the present embodiment is 11 bits. To distinguish the header shown in FIG. 19 from an EH to be described hereinbelow, it will be referred to as an integrated generic MAC header.

Figure 20:
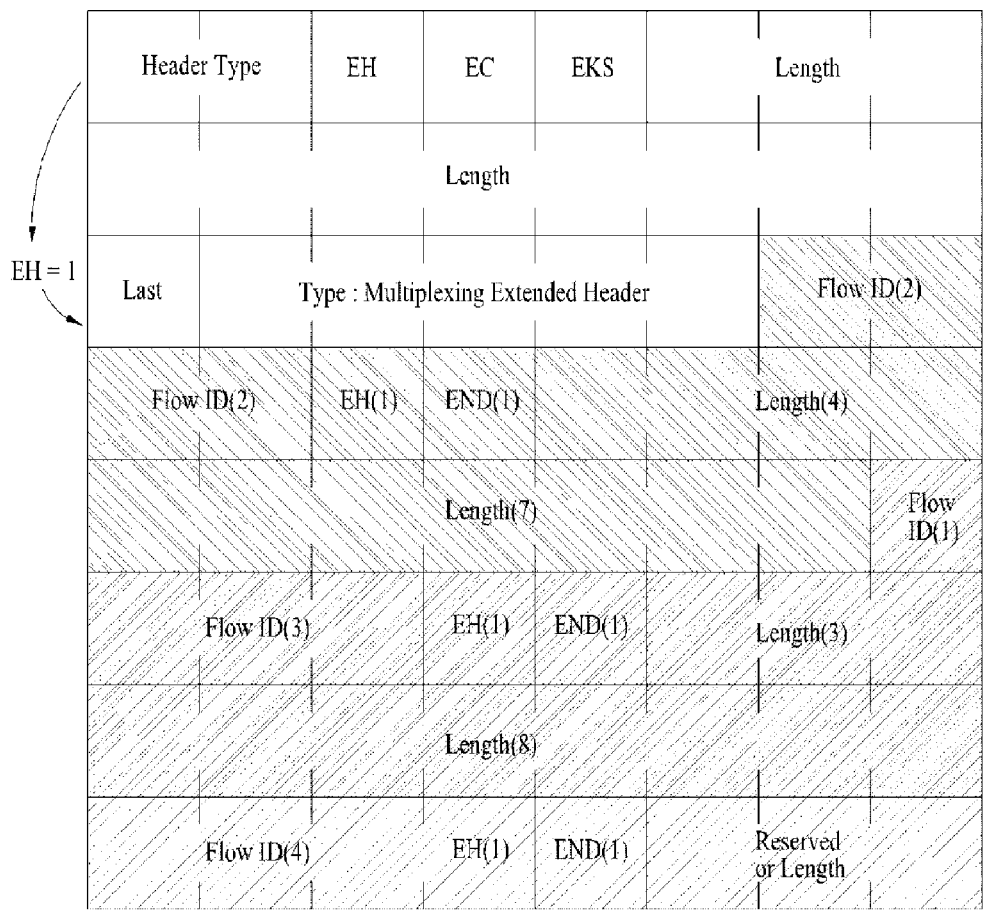
FIG. 20 is a diagram explaining a multiplexing MAC header according to the fourth embodiment of the present invention.

FIG. 20 is a diagram explaining a multiplexing MAC header according to the fourth embodiment of the present invention.

To use a MAC header as the multiplexing MAC header as shown in FIG. 20, it is assumed that an EH field of an integrated generic MAC header is set to 1. It is assumed that an MEH is additionally appended after this integrated generic MAC header. Namely, the present embodiment proposes the integrated generic MAC header and the subsequent MEH in the following form.

As described above, an HT field of the integrated generic MAC header may represent whether a currently transmitted header field is a multiplexing MAC header or a management MAC header. In an example of FIG. 20, it is assumed that the currently transmitted header field is the multiplexing header. It is also assumed that an EH field is set to 1 to represent that a subsequent MEH is present.

The present embodiment assumes that the MEH is transmitted after the integrated generic MAC header of 2 bytes in order to transmit SDUs for transmission to the same MS but different flow IDs through one MAC header. Information about each flow ID is indicated by a Flow ID field, an EH field, an END field, and a Length field and each field may be repeated by the number of multiplexed flow IDs. The EH field in the MEH may represent whether an EH for each flow ID is present. If the END field is set to 1, the Length field for the last SDU may be omitted. Meanwhile, byte assignment may be performed in the last part of an EH.

In a multiplexing header, one EKS per flow ID may be set. If so, the contents of the MEH may be changed as follows:

Flow ID+EH+EKS+END+LENGTH

If the MEH is used as described above, an EKS of the MAC header may be meaningless and, at this time, a value of an EC field may be set to 0 to disregard the EKS of the MAC header.

Figure 21:
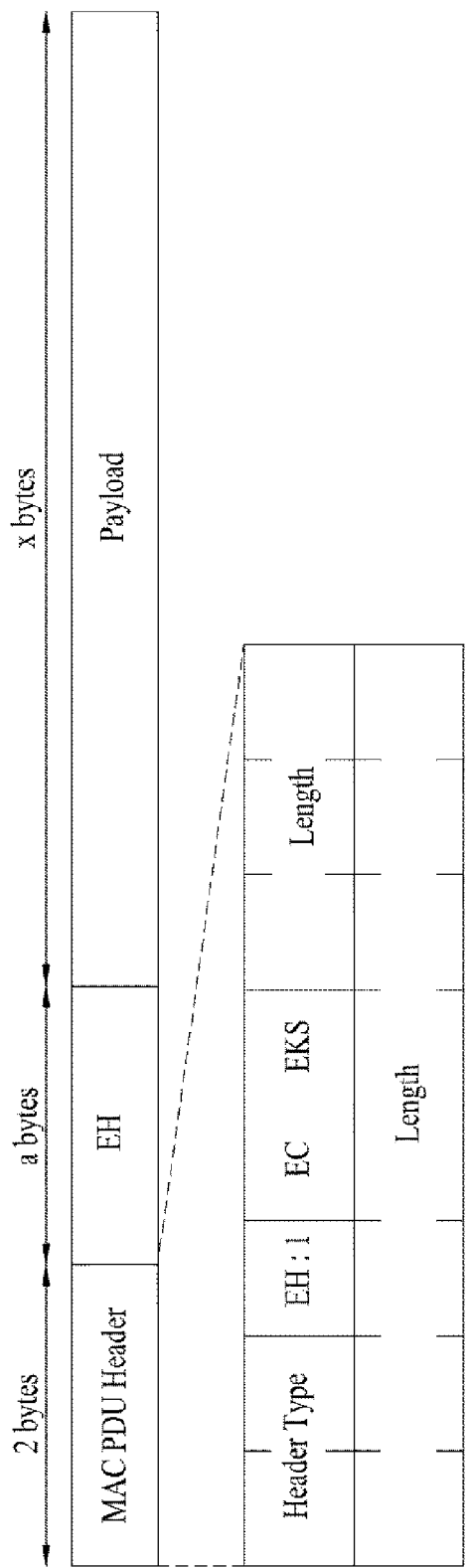
FIG. 21 is a diagram explaining the structure of a management MAC header according to the fourth embodiment of the present invention.

FIG. 21 is a diagram explaining the structure of a management MAC header according to the fourth embodiment of the present invention.

The management MAC header according to the present embodiment may be used without an additional MEH. If an MEH is not additionally transmitted, payload information may be recognized as a management MAC message.

In FIG. 21, an EH may be an EH other than a multiplexing header. In this embodiment, it is assumed that the management header is not multiplexed for transmission because an additional flow ID is not needed. In other words, it is assumed that the management MAC header is transmitted without attaching an MEH.

Figure 22:
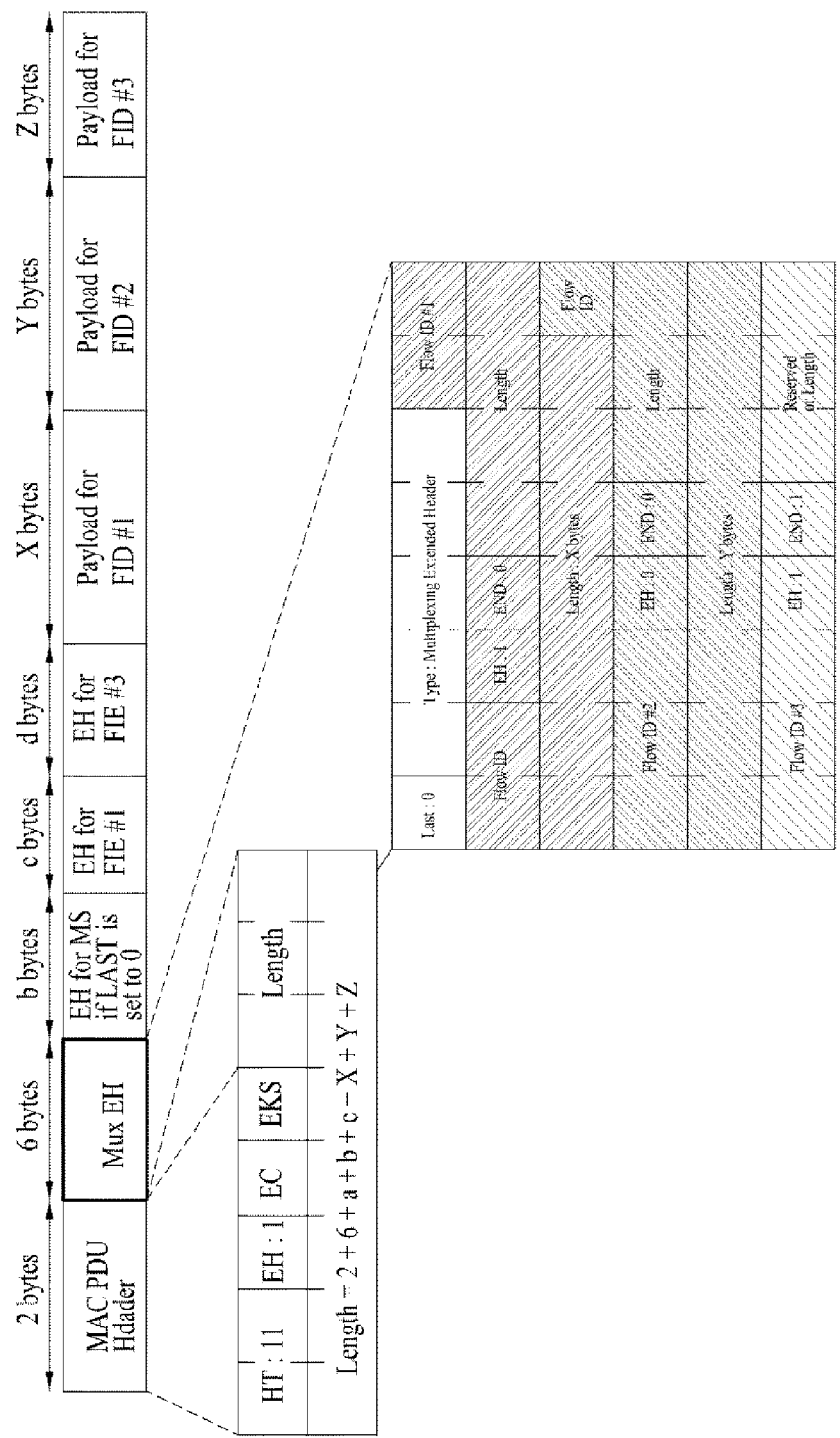
FIG. 22 and FIG. 23 are diagrams explaining a multiplexing MAC header transmission method according to the fourth embodiment of the present invention.
Figure 23:
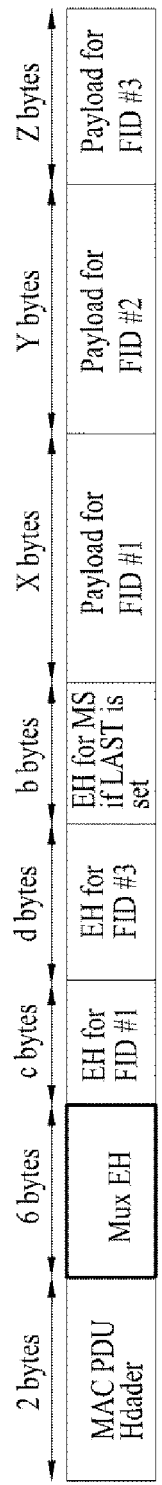

FIG. 22 and FIG. 23 are diagrams explaining a multiplexing MAC header transmission method according to the fourth embodiment of the present invention.

As shown in FIG. 22, a multiplexing EH may be added after a MAC header by setting an EH field of the MAC header to 1. If a value of a LAST field of the multiplexing EH (Mux EH) represents that a subsequent EH is present, this means that there is an additional EH for an MS (i.e. STID) and this EH may be added immediately after the Mux EH. In addition, an EH for each flow ID, (e.g. fragmentation/packing EH) may be needed. This may be expressed by an EH field within the Mux EH or each EH may be added in front of a payload in order of flow IDs appearing in the Mux EH.

An EH for an MS and an EH for each flow ID may be added in order as shown in FIG. 23.

Fifth Embodiment

The present embodiment proposes transmission of information (Flow ID field and Length field) about the first flow ID through a Generic MAC Header (GMH) and transmission of information about the other connections through a MAC multiplexing extended header, when a MAC PDU transmits SDUs/payloads for multiple connections. In this case, a description will be given of which method is used to inform whether an EH for each flow ID is transmitted.

Figure 25:
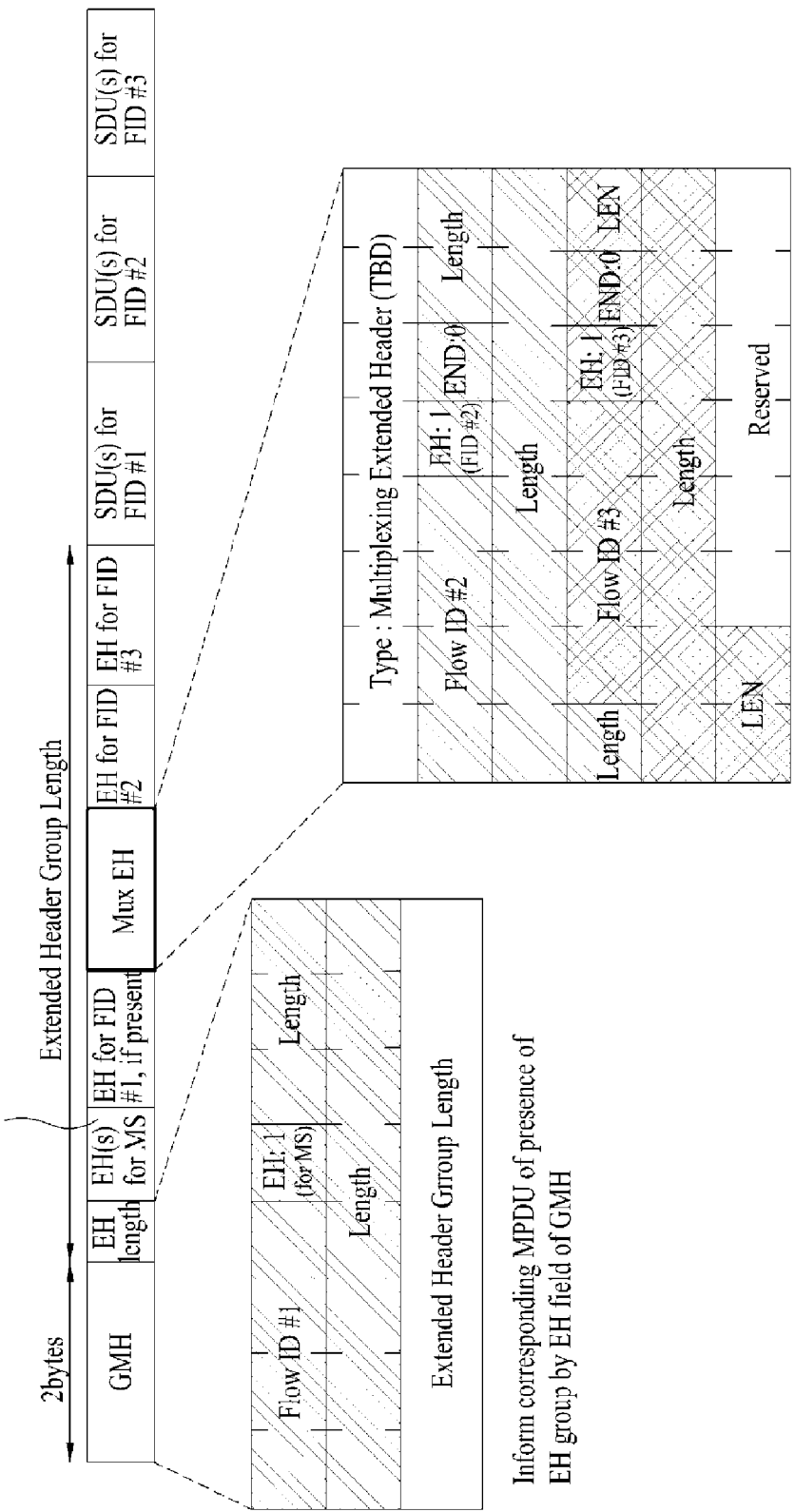
FIG. 25 and FIG. 26 are diagrams illustrating the structure of a MAC PDU according to a fifth embodiment of the present invention.
Figure 26:
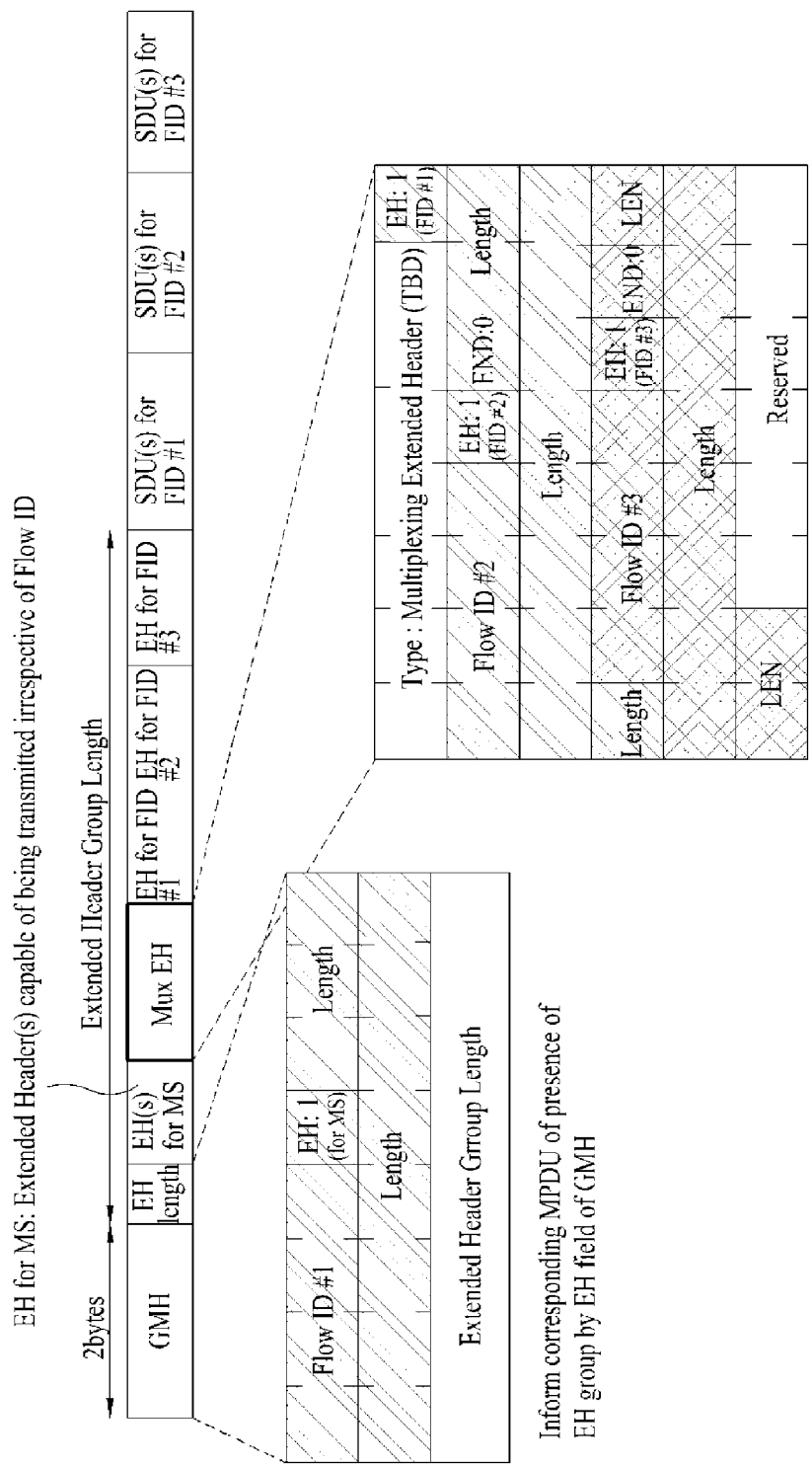

FIG. 25 and FIG. 26 are diagrams illustrating the structure of a MAC PDU according to a fifth embodiment of the present invention.

As shown in FIG. 25, if a Flow ID field of a GMH represents flow ID information about the first payload, an EH field of the GMH represents whether an EH for an MS is present. The present embodiment proposes setting of an EH for a corresponding flow ID so as to be transmitted before an MEH if a MAC PDU is a multiplexing MAC PDU and if an EH (e.g. FPEH) for the first flow ID is present. This allows the MEH or GMH to implicitly confirm whether an EH for the first ID is present without explicitly informing whether an EH for a corresponding connection is present.

In this embodiment, if a MAC PDU transmits information about multiple flow IDs as shown in FIG. 26, a field representing whether an EH for the first flow ID is present is defined as the first field, so that it is possible to know whether the EH for the first flow ID is transmitted after an MEH. If information about the first flow ID is transmitted through a GMH of a multiplexed MPDU, the first field of the MEH may be used to represent whether the EH for the first flow ID is present. In addition, "Flow ID field+EH field+END field+Length field" may be added by as many as the number of multiplexed connections in a repetitive form. Namely, since an EH for each flow ID may be added, EH fields corresponding to the number of flow IDs indicated by the MEH may be located after MEH. Presence/absence of the EH for the first flow ID may be included as the first field before indicating information about a multiplexed flow ID within the MEH. If the length of a GMH indicates the length of a whole MAC PDU, the length for the last flow ID may be omitted.

Hereinafter, a communication method and apparatus using the above-described MAC header structure will be described.

Figure 24:
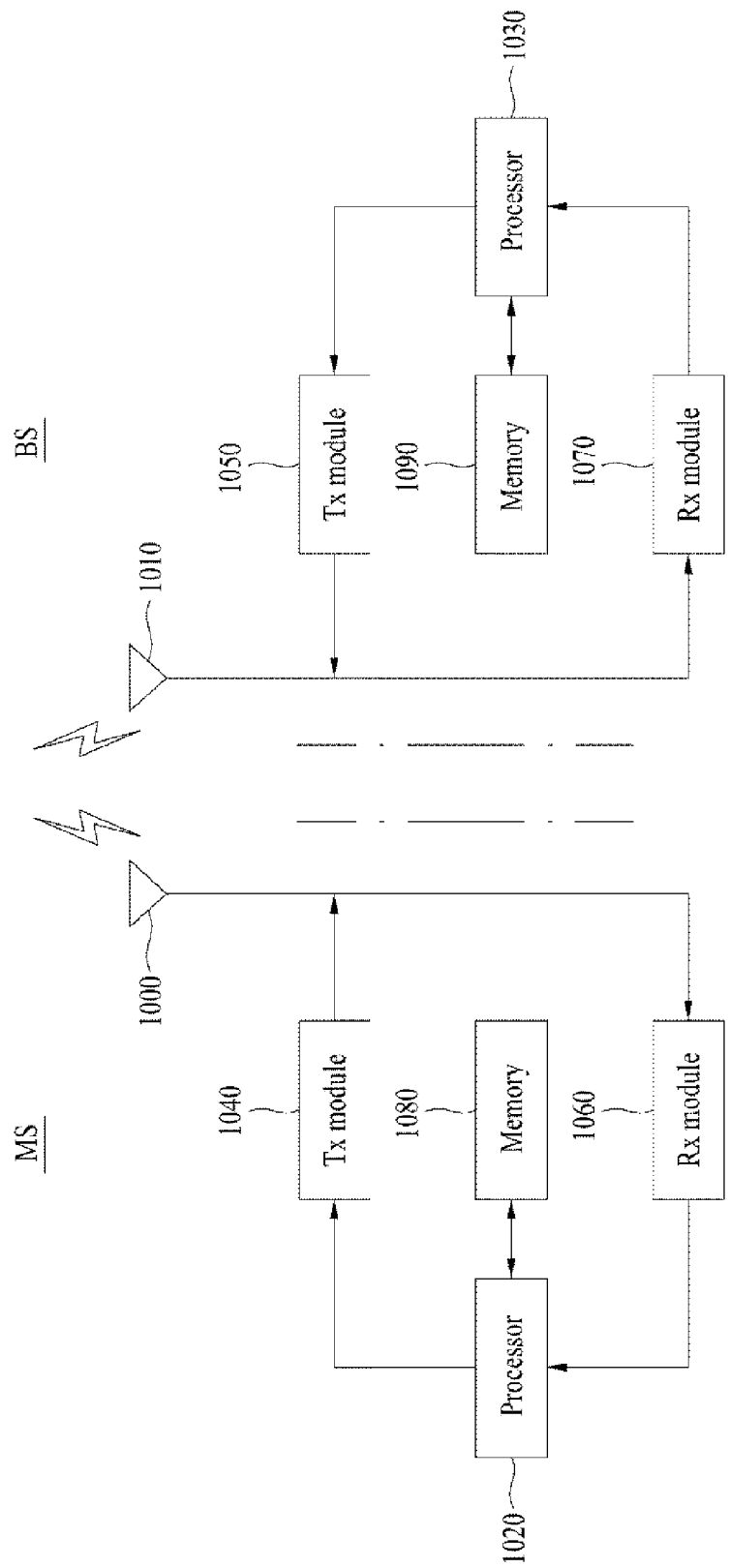
FIG. 24 is a diagram illustrating the structure of an MS and a BS through which the above-described embodiments can be implemented, according to another embodiment of the present invention.

FIG. 24 is a diagram illustrating the structure of an MS and a BS through which the above-described embodiments can be implemented, according to another embodiment of the present invention.

The MS and the BS include antennas 1000 and 1010 for transmitting and receiving information, data, signals, and/or messages, transmission (Tx) modules 1040 and 1050 for transmitting messages by controlling the antennas, reception (Rx) modules 1060 and 1070 for receiving messages by controlling the antennas, memories 1080 and 1090 for storing information associated with communication with the BS, and processors 1020 and 1030 for controlling the Tx modules, the Rx modules, and the memories.

The antennas 1000 and 1010 transmit signals generated from the Tx modules 1040 and 1050 to the outside, or transfer radio signals received from the outside to the Rx modules 1060 and 1070. If a Multiple Input Multiple Output (MIMO) function is supported, each of the antennas may include two or more antennas.

The processors 1020 and 1030 typically control overall operation of the MS or the BS. Especially, the processors may carry out a control function for performing the embodiments of the present invention. For example, the processors may generate a MAC PDU having a MAC header described in the above various embodiments, transmit the generated MAC PDU to the Tx modules 1040 and 1050, and process a MAC PDU received from the Rx modules 1060 and 1070. In addition, the processors may perform a MAC frame variable control function based on service characteristics and propagation environments, a handover function, an authentication and encryption function, and the like. The processors 1020 and 1030 may include encryption modules for controlling encryption of various messages and timer modules for controlling transmission/reception of various messages.

The Tx modules 1040 and 1050 perform predetermined coding and modulation on signals and/or data, which are scheduled from the processors and include a MAC PDU to be transmitted to the outside, and then transfer the modulated signals and/or data to the antennas 1000 and 1010.

The Rx modules 1060 and 1070 perform decoding and demodulation of radio signals received through the antennas 1000 and 1010 from the outside, restore the signals into original data, and transfer the restored data to the processors 1020 and 1030.

The memories 1080 and 1090 may store programs required for processing and control of the processors and temporarily store input and output data (in case of the MS, uplink grant allocated from the BS, system information, an STID, an FID, action time, region allocation information, and frame offset information).

Each of the memories may include at least one storage medium among a flash memory-type storage medium, a hard disk-type storage medium, a multimedia card micro-type storage medium, a card-type memory (e.g. SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

The embodiments according to the present invention can be implemented by various means, for example, hardware, firmware, software, or combination thereof. If the embodiment according to the present invention is implemented by hardware, the embodiment of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described above. For example, software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

It will be apparent that claims which are not explicitly dependent on each other can be combined to provide an embodiment or new claims can be added through amendment after this application is filed.

INDUSTRIAL APPLICABILITY

Although the above description has focused on an IEEE 802.16 series system, it is applicable to a 3GPP or 3GPP2 series system in a similar way.

The invention claimed is:

1. A method for transmitting signals to a receiver at a transmitter, the method comprising:
    multiplexing, at a transmitter processor, a plurality of pieces of data for a plurality of connections to be transmitted to one specific receiver, and configuring a multiplexed Medium Access Control (MAC) Packet Data Unit (PDU) which includes a MAC header part for transmitting the multiplexed data and includes a MAC PDU payload including the multiplexed data; and
    transmitting, at the transmitter, the multiplexed MAC PDU to the specific receiver;
    wherein the MAC header part includes a first header part including a generic MAC header and includes a second header part including an extended header indicator serving as a one-bit indicator representing whether an extended header is present for each flow ID indicating each of the plurality of connections, and
    wherein the MAC header part selectively further includes a third header part including the extended header for each flow ID according to the extended header indicator for each flow ID.

2. The method of claim 1, wherein data transmitted by the transmitter is distinguished by a station ID for distinguishing between respective receivers and by the flow ID for distinguishing between respective connections with the specific receiver.

3. The method of claim 1, wherein the generic MAC header includes a first field containing flow ID information and includes a second field representing the length of the multiplexed MAC PDU.

4. The method of claim 1, wherein the extended header indicator of the second header represents, if the number of the plurality of connections is N, whether an extended header for each flow ID is present using one bit for each of N flow IDs.

5. The method of claim 1, wherein the extended header of the third header part includes a type field representing a type of each extended header and includes a contents field containing content of each extended header.

6. The method of claim 5, wherein the extended header further includes an END field representing whether an additional header is present after the extended header.

7. The method of claim 1, wherein the second header part is a multiplexing extended header.

8. A transmitter for transmitting signals to a receiver, the transmitter comprising:
    a processor for multiplexing a plurality of pieces of data for a plurality of connections to be transmitted to a specific receiver, and configuring a multiplexed Medium Access Control (MAC) Packet Data Unit (PDU) which includes a MAC header part for transmitting the multiplexed data and includes a MAC PDU payload including the multiplexed data; and
    a transmission module for transmitting the multiplexed MAC PDU to the specific receiver;
    wherein the MAC header part includes a first header part including a generic MAC header and includes a second header part including an extended header indicator serving as a one-bit indicator representing whether an extended header is present for each flow ID indicating each of the plurality of connections, and wherein the MAC header part selectively includes a third header part including the extended header for each flow ID according to the extended header indicator for each flow ID.

9. The transmitter of claim 8, wherein data transmitted by the transmitter is distinguished by a station ID for distinguishing between respective receivers and by the flow ID for distinguishing between respective connections with the specific receiver.

10. The transmitter of claim 8, wherein the generic MAC header includes a first field containing flow ID information and includes a second field representing the length of the multiplexed MAC PDU.

11. The transmitter of claim 8, wherein the extended header indicator of the second header part represents, if the number of the plurality of connections is N, whether an extended header for each flow ID is present using one bit for each of N flow IDs.

12. The transmitter of claim 8, wherein the extended header of the third header part includes a type field representing a type of each extended header and includes a contents field containing content of each extended header.

13. The transmitter of claim 8, wherein the second header is a multiplexing extended header.

14. A method for receiving signals from a transmitter at a receiver, the method comprising:
   receiving, from the transmitter, a Medium Access Control (MAC) Packet Data Unit (PDU) obtained by multiplexing a plurality of pieces of data for a plurality of connections transmitted to the receiver; and
   processing, at a receiver processor, a multiplexed MAC PDU which includes a MAC header part of the MAC PDU and includes a MAC PDU payload containing the multiplexed data;
   wherein the MAC header part includes a first header part including a generic MAC header and includes a second header part including an extended header indicator serving as a one-bit indicator representing whether an extended header is present for each flow ID indicating each of the plurality of connections, and
   wherein the MAC header part selectively includes a third header part including the extended header for each flow ID according to the extended header indicator for each flow ID.

15. A receiver for receiving signals from a transmitter, the receiver comprising:
   a reception module for receiving, from the transmitter, a Medium Access Control (MAC) Packet Data Unit (PDU) obtained by multiplexing a plurality of pieces of data for a plurality of connections transmitted to the receiver; and
   a processor for processing a multiplexed MAC PDU which includes a MAC header part of the MAC PDU and includes a MAC PDU payload containing the multiplexed data;
   wherein the MAC header part includes a first header part including a generic MAC header and includes a second header part including an extended header indicator serving as a one-bit indicator representing whether an extended header is present for each flow ID indicating each of the plurality of connections, and
   wherein the MAC header part selectively includes a third header part including the extended header for each flow ID according to the extended header indicator for each flow ID.

* * * * *